US012797277B2

(12) United States Patent
Luklinski

(10) Patent No.: US 12,797,277 B2
(45) Date of Patent: Nov. 17, 2026

(54) ELECTRIC SPINE BACK RACK ORTHOPEDIC APPARATUS FOR ALLEVIATING BACK PAIN AND DECOMPRESSING FACET JOINTS AND SPINE VERTEBRAS

(71) Applicant: Bohdan Miroslaw Luklinski, Guildford (GB)

(72) Inventor: Bohdan Miroslaw Luklinski, Guildford (GB)

( * ) Notice: Subject to any disclaimer, the term of this patent is extended or adjusted under 35 U.S.C. 154(b) by 0 days.

(21) Appl. No.: 19/426,623

(22) Filed: Dec. 19, 2025

(65) Prior Publication Data

US 2026/0115079 A1 Apr. 30, 2026

Related U.S. Application Data

(63) Continuation-in-part of application No. 17/895,497, filed on Aug. 25, 2022, now abandoned.

(51) Int. Cl.
*A61H 1/00* (2006.01)

(52) U.S. Cl.
CPC ..... *A61H 1/008* (2013.01); *A61H 2201/0149* (2013.01); *A61H 2201/1207* (2013.01); *A61H 2201/5025* (2013.01)

(58) Field of Classification Search
CPC ................ A61H 1/0218; A61H 1/0292; A61H 23/00–06; A61H 2201/0107; A61H 2201/0149; A61H 2201/12–1246; A61H 2201/1619; A61H 2201/1623; A61H 2205/081; A61H 39/00–086;
(Continued)

(56) References Cited

U.S. PATENT DOCUMENTS 7,311,681 B1 * 12/2007 Vaccarella ......... A61H 23/0263 601/49
7,762,966 B1 * 7/2010 Gaines ............... A61H 15/0078 601/84

(Continued)

FOREIGN PATENT DOCUMENTS

CN 111685982 A * 9/2020 ............. A61H 7/007
CN 113397951 A * 9/2021 ........... A61G 15/007

(Continued)

OTHER PUBLICATIONS

Translation of CN 111685982. Accessed from PE2E-Search on Mar. 24, 2025. (Year: 2020).*

(Continued)

*Primary Examiner* — Paige Kathleen Bugg
(74) *Attorney, Agent, or Firm* — Bay State IP, LLC

(57) ABSTRACT

This present invention relates to an electric spine back pain-relieving device. The device is configured to be integrated or retrofitted to backrest of a chair for providing support to spine of a user. The device has a set of modules and has an integrated electric source for providing mechanical pressure on facet joints of vertebra of spine of a human. Each module carries a set of spindles comprising a pair of barrel-shaped or spherical spindle nodules that are positioned upon facet joints of the spine for alleviating pain. The electric source may be selectively activated using a push button and the device works on one of the two modes: single action mode and block action mode.

9 Claims, 11 Drawing Sheets

(58) Field of Classification Search
CPC ........ A61H 7/00–008; A61H 2007/009; A61H 15/00–02
USPC ......... 601/19, 52, 98–99, 113, 115, 118, 128
See application file for complete search history.

(56) References Cited

U.S. PATENT DOCUMENTS

| | | | | |
|---|---|---|---|---|
| 2004/0158176 | A1 * | 8/2004 | Park | A61H 39/04 601/134 |
| 2008/0146979 | A1 * | 6/2008 | Brown | A61H 37/00 601/115 |
| 2010/0137762 | A1 * | 6/2010 | Tsai | A61H 15/0078 601/134 |
| 2021/0282999 | A1 * | 9/2021 | Bouchet | A61H 23/006 |

FOREIGN PATENT DOCUMENTS

| | | | | | |
|---|---|---|---|---|---|
| CN | 114176966 | A | * | 3/2022 | A61H 39/04 |
| CN | 114903773 | A | * | 8/2022 | A61H 33/066 |
| CN | 115317357 | A | * | 11/2022 | A61H 7/007 |
| KR | 20020008654 | A | * | 1/2002 | A61H 39/06 |
| KR | 20150053588 | A | * | 5/2015 | A61H 15/0078 |

OTHER PUBLICATIONS

Translation of CN 113397951. Accessed from PE2E-Search on Mar. 24, 2025. (Year: 2021).*
Translation of CN 114176966. Accessed from PE2E-Search on Mar. 24, 2025. (Year: 2022).*
Translation of CN 114903773. Accessed from PE2E-Search on Mar. 24, 2025. (Year: 2022).*
Translation of CN 115317357. Accessed from PE2E-Search on Mar. 24, 2025. (Year: 2022).*
Translation of KR 2015/0053588. Accessed from PE2E-Search on Mar. 24, 2025. (Year: 2015).*
Translation of KR 2002/0008654. Accessed from PE2E-Search on Mar. 24, 2025. (Year: 2002).*

* cited by examiner

ELECTRIC SPINE BACK RACK ORTHOPEDIC APPARATUS FOR ALLEVIATING BACK PAIN AND DECOMPRESSING FACET JOINTS AND SPINE VERTEBRAS

CROSS-REFERENCE TO RELATED APPLICATION

This application is a continuation-in-part application which claims the benefit of and takes priority from U.S. Utility patent application Ser. No. 17/895,497 filed on Aug. 25, 2022, the contents of which are herein incorporated by reference.

FIELD OF THE INVENTION

The present invention relates generally to the field of orthopedic and back pain-relieving devices. More specifically, the present invention relates to a novel device that can be integrated or retrofitted in any chair for decompressing facet joints of spine of a human. A number of spindle nodules abut the facet joints of spine for decompression and help in alleviating back pain caused due to passive seating on a chair.

BACKGROUND OF THE INVENTION

By way of background, human spine consists of a number of vertebrae, or units of bone, arranged in a vertical structure, also known as the spinal column. The spinal column consists of five distinct regions namely Cervical spine, Thoracic spine, Lumbar spine, Sacrum, and Coccyx. Further, the spine of a human performs two-fold functions-providing structural support for the body and allowing to move freely in six dimensions: flexion, extension, side flexion left/right and rotation left/right. In order to achieve support and motion, the vertebrae in the top three sections (Cervical spine, Thoracic spine, and Lumbar spine) must be allowed to move relative to one another, without compromising the structural rigidity of the back. This is achieved by the use of facet joints, which lock the vertebrae together whilst allowing for articulated movement. The joints are referred to as facet joints because they are formed when the faces of two bones come together.

Unfortunately, facet joints are prone to be compressed relatively easily. When the facet joints are compressed, the vertebrae in the spine can no longer move freely. Humans feel stiff and experience back pain because of compressed facet joints. Various researches have shown that up to 99.5% of all back pain is caused by skeletal deformity, discs/nerves pathology.

Back pain due to compression of facet joints is a common issue in seats like automobile, aviation, and furniture seats and moreover in all sedentary passive positions causing bulging discs. People who work in offices, drivers, pilots and people who commute on a daily basis are prone to back pain and discomfort due to compression of facet joints. Current seat structures do not address problems of back pain due to compression of facet joints and therefore, people desire a method and a device for alleviating back pain by de-compressing the spine of a user.

Therefore, there exists a long-felt need in the art for a device that solves the back pain problem by de-compressing the spine while passive seating occurs. There is also a long-felt need in the art for a back pain alleviating device that can be integrated in seats in automobiles, aviation and furniture. Additionally, there is a long-felt need in the art for a back support device that improves health of the spine. Moreover, there is a long-felt need in the art for a device that conforms to the curvature of the human spine. Finally, there is a long-felt need in the art for a device that performs de-compression of facet joints.

The electric spine back rack device of the present invention accomplishes all of the forgoing objectives and provides users with a spinal electric device for relieving back pain. The spindles of the device are activated mechanically causing decompression of facet joints. The spindle penetration of the device depends on an individual's tissue thickness/mass layers tissues and muscles and the device is effective, irrespective of spinal joint distribution upon the spindles.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an electric spine orthopedic device made of plastic or similar material and is configured to integrate or retrofit to a chair for providing relief from back pain to people sitting in the chair. The device further comprising a rectangular frame having a pair of arms, a plurality of spindles attached to and crossing the space between said pair of arms, the plurality of spindles forming groups located in the position of cervical, thoracic, lumbar, and pelvic regions of a spine of a human, each spindle in said cervical, thoracic, and lumbar groups having a pair of nodules, wherein the nodules of each pair are positioned 7.5 cm apart and are round or barrel shaped, an electric source for providing electric power to create forward mechanical movement of the said nodules, and said mechanical pressure is applied in one of said cervical, thoracic, and lumbar regions for a duration of up to six seconds or on a plurality of facet joints simultaneously.

In another embodiment, the electric spine orthopedic device is made of plastic or similar material and is configured to integrate or retrofit to a chair for providing relief from back pain to people sitting in the chair. The device further comprising a set of modules each having a set of spindles, the modules located in the position of cervical, thoracic, and lumbar regions of a spine of a human, each spindle in said cervical, thoracic, and lumbar groups having a pair of two round or barrel shaped nodules positioned 7.5 cm apart, a power source for providing electric power to create mechanical pressure/forward movement of each module, and said mechanical pressure is applied via the nodules in one of said cervical, thoracic, or lumbar regions for a duration of up to six seconds or on a plurality of facet joints simultaneously.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
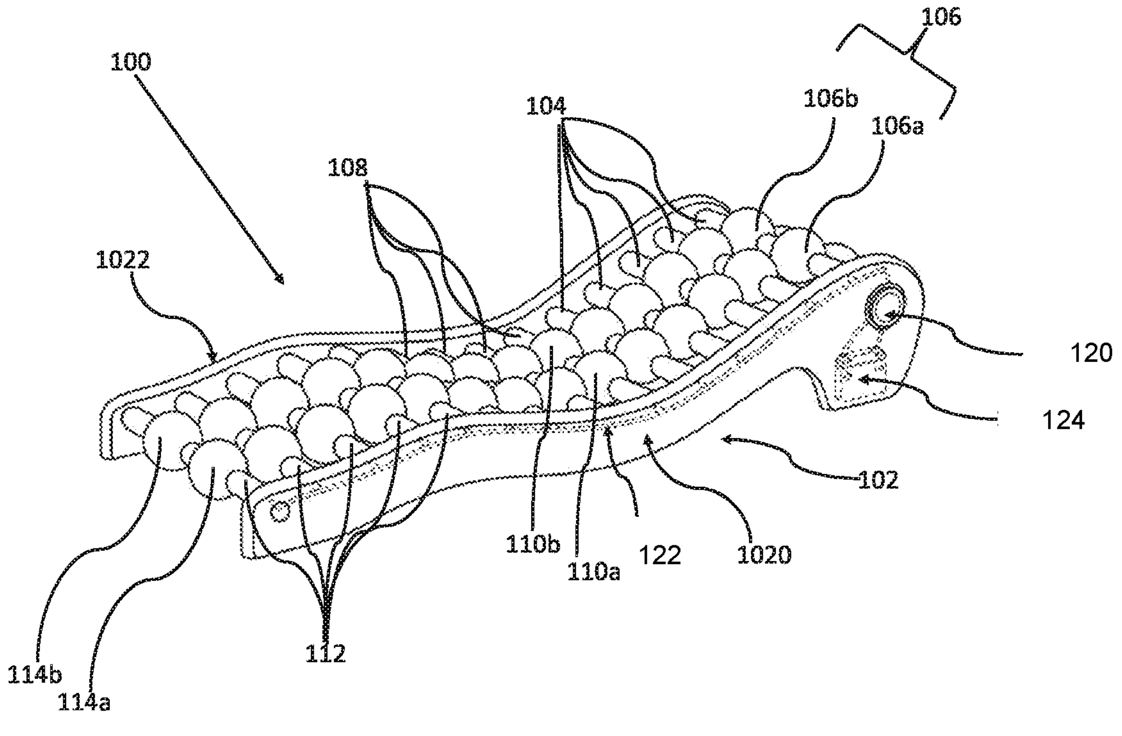
FIG. 1 illustrates a perspective view of one potential embodiment of the electric spine back rack device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. The well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that solves the back pain problem by de-compressing the spine while passive seating occurs. There is also a long-felt need in the art for a back pain alleviating device that can be integrated in seats in automobiles, aviation and furniture.

Referring initially to the drawings, FIG. 1 illustrates a perspective view of one potential embodiment of an electric back rack device 100 of the present invention in accordance with the disclosed architecture. The electric spine back rack device 100 of the present invention is an orthopedic spine back rack device for decompressing facet joints and helping in alleviating back pain. In one embodiment, the device 100 is designed to support the spine of a human and conform to the shape of the human spine. More specifically, the device 100 provides decompression of facet joints on cervical, thoracic and lumbar regions of the spine without any side effects. The electric spine back rack orthopedic device 100 provides complete relief from skeletal pain and tension, by decompressing skeletal deformity, discs, nerves pathology and helps in increasing flexibility, mobility, and range of motion.

In one embodiment, the device 100 mirrors the natural shape of the human spine and has a frame 102 made of a durable and hard material like heavy-duty plastic. The frame 102 has a first group of spindles 104 wherein each spindle 106 of the first group of spindles 104 carries a pair of barrel shaped nodules 106*a*, 106*b* for applying pressure on facet joints. For clarity, nodules of only one of the spindle are annotated. More specifically, the pair of barrel shaped nodules 106*a*, 106*b* are used for decompressing facet joints positioned on the cervical portion of the spinal column.

Similarly, a second group of spindles 108 is positioned below the first group of spindles 104 wherein each spindle 110 of the second group of spindles 108 carries a pair of barrel shaped nodules 110*a*, 110*b* for decompressing facet joints of the thoracic column of the spine. A third group of spindles 112 having a spindle 114 including a pair of barrel shaped nodules 114*a*, 114*b* in each spindle is used for decompressing the lumbar column of the human spine. The pair of nodules in each spindle is positioned such that the nodules abut the facet joints of the spine.

In this embodiment, the first group of spindles 104 and the third group of spindles 112 are positioned on a convex shape of the frame 102 and the second group of spindles 108 are positioned on a concave shape of the frame 102. Further, each of the spindle of the frame 102 extends between a first arm 1020 and a second arm 1022.

In one embodiment, the orthopedic device 100 has a push button 120 positioned on one of the arms of the frame 102 and is coupled to a circuit 122 passing along the frame 102 wherein the button 120 is configured to pass electric current from a power source 124 to one or more pair of spindles 106, 110, 114 for applying nodules penetration for decompressing facet joints. In the preferred embodiment, the depth of the nodules penetration applied by the mechanical pressure may be up to 10 mm transversely depending on an individual person's tissue thickness / mass layers tissues and muscles.

In the preferred embodiment, the nodules in each spindle have a transverse distance of 7.5 cm there between and each pair of the nodules has the same distance allowing a symmetric effect on the spine of a user. The orthopedic device 100 is configured to put mechanical pressure for decompressing facet joints in one direction i.e., either from top of the spine to bottom of the spine (exerting mechanical pressure from first group of spindles 104 first to the third group of spindles 112 at the end) or from the bottom of the spine to the top of the spine (exerting mechanical pressure from the third group of spindles 112 at the end to the first group of spindles 104). When the spindles' nodules penetrate the spine, each vertebra is decompressed individually or several vertebras are decompressed simultaneously as described later in the disclosure.

Figure 2:
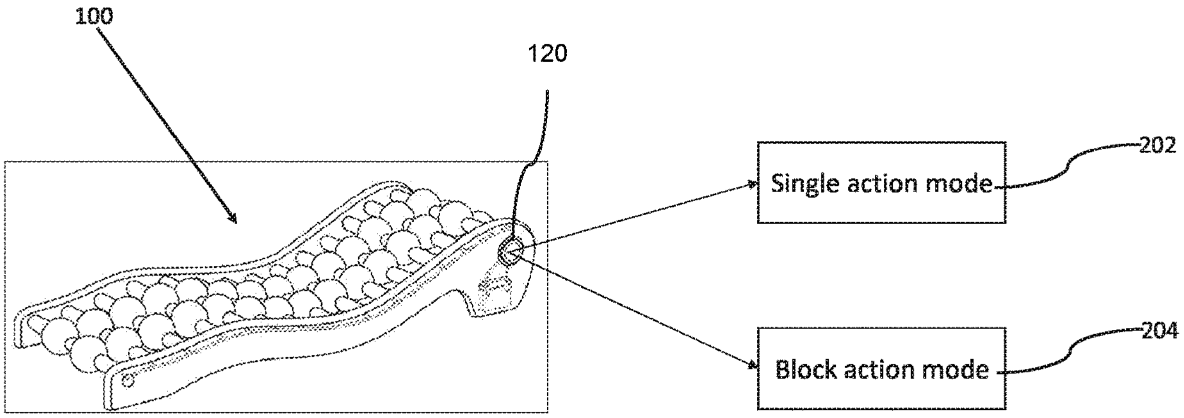
FIG. 2 illustrates a block diagram illustrating different modes of the electric spine back rack orthopedic device of the present invention in accordance with the disclosed architecture.

FIG. 2 illustrates a block diagram illustrating different modes of the electric orthopedic device of the present invention in accordance with the disclosed architecture. The device 100 is configured to work in two modes: a single action mode 202 and a block action mode 204. The push button 120 may be used for selecting one of the two modes 202, 204 for decompressing facet joints of the spine. In single action mode 202, pressure is applied to any section of the spine i.e., one of cervical, thoracic or lumbar section of the spine at one time. As an example, in single action mode 202, the pressure is applied to facet joints of L1 to L5 vertebras of lumbar column of the spine. The pressure is configured to be applied for up to six seconds and may be applied in a constant or intermittent manner.

In block action mode 204, all spindles are activated simultaneously allowing a plurality of vertebras to be pressurized allowing decompression of different facet joint positioned in different sections of the spine. In the block action mode 204, different sets of four spindles are consecutively pressurized allowing decompression of facet joints.

Figure 3:
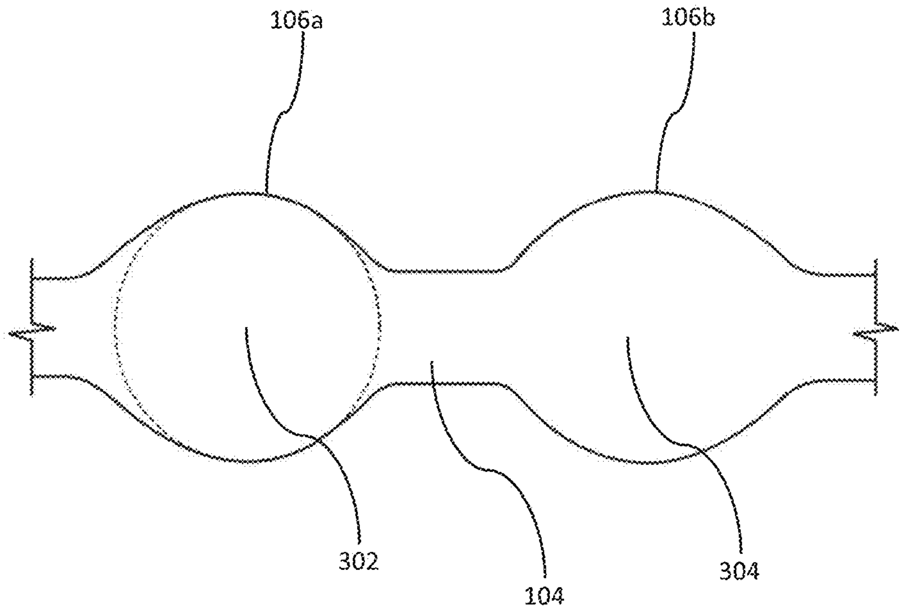
FIG. 3 illustrates a close view of nodules of a spindle used in the orthopedic spine back rack device of the present invention in accordance with the disclosed architecture.

FIG. 3 illustrates a close view of nodules of a spindle used in the orthopedic spine back rack device of the present invention in accordance with the disclosed architecture. The nodules 106*a*, 106*b* have a diameter of about 48 mm and are round or barrel shaped such that when a user sits against the device 100, the nodules abut against the facet joints or vertebras of the spine. The diameter of the spindle 104 in the areas outside of the nodules is about 14 mm, while in between the nodules the diameter is about 20 mm.

In the preferred embodiment, the distance between centers 302, 304 of the nodules 106*a*, 106*b* is about 75 mm which is designed specifically to match the gap/distance between the human spine facet joints that run through the spine of a human. It should be noted that in the figure, the nodules 106*a*, 106*b* shown are exemplary but all the nodules used in the device 100 may have the same shape and sizes allowing a uniform mechanical pressure to be applied on the facet joints/vertebras of the spine of a user.

Figure 4:
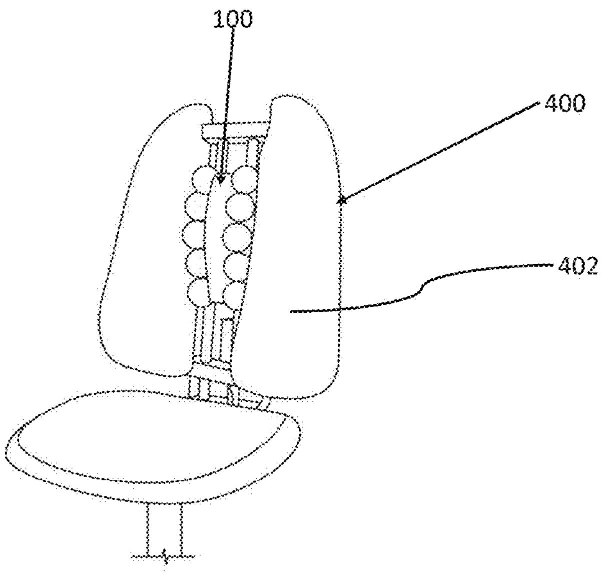
FIG. 4 illustrates a perspective view of one potential embodiment of the electric orthopedic back rack device of the present invention being installed in a chair in accordance with the disclosed architecture.

FIG. 4 illustrates a perspective view of one potential embodiment of the electric orthopedic spine back rack device 100 of the present invention being installed in a chair in accordance with the disclosed architecture. The spine back rack device 100 is configured to be installed in automobiles, airplanes, office seats and more for allowing decompression of facet joints/vertebras of the spine of a user sitting on a seat with the device 100 installed.

Figure 5:
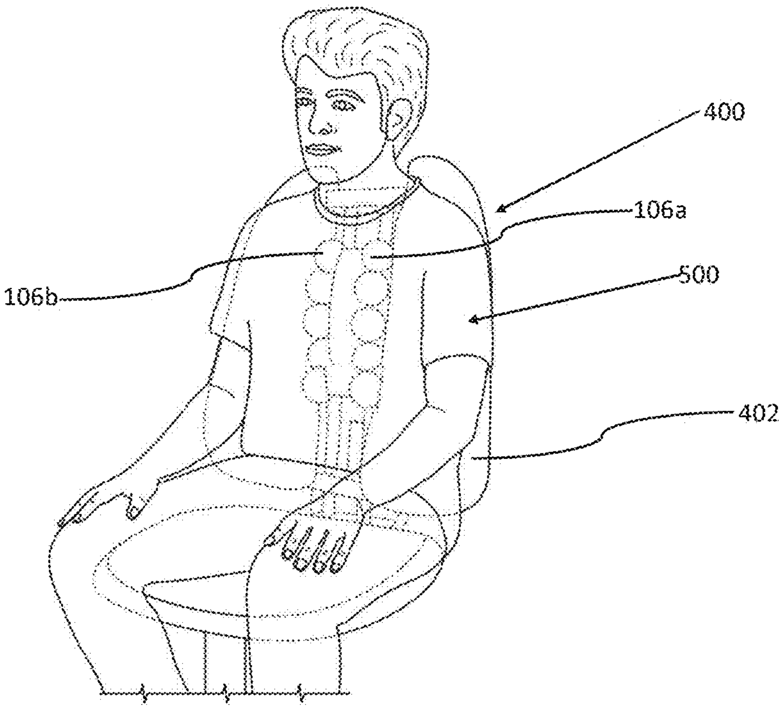
FIG. 5 illustrates a perspective view of a user sitting on the chair with installed device in accordance with the disclosed architecture.

As illustrated in the exemplary chair 400, the device 100 is positioned in the backrest 402 such that the nodules of the spindles abut against the facet joint of a user sitting on the chair 400 as illustrated in FIG. 5. In one embodiment, the device 100 is integrated into the chair 400 and alternatively, the device 100 may be retrofitted to the chair 400.

It should be appreciated that based on the design of the chair 400 and requirements of a user, the number of spindles in the frame may vary and even the mechanical pressure applied by the nodules may vary. The device 100 may work in both single action mode 202 and block action mode 204 described in FIG. 2.

FIG. 5 illustrates a perspective view of a user sitting on the chair 400 with installed one exemplary section of the device 100 in accordance with the disclosed architecture. A user 500 can sit on the chair 400 having a section of the device 100 integrated without any discomfort due to having support on the spine where the nodules abut the facet joints of the spine. As illustrated, the exemplary nodules 106*a*, 106*b* are installed such on the backrest 402 of the chair 400 such that the nodules exert mechanical pressure for decompressing the facet joints/vertebras and helping in alleviating the back pain.

Figure 6:
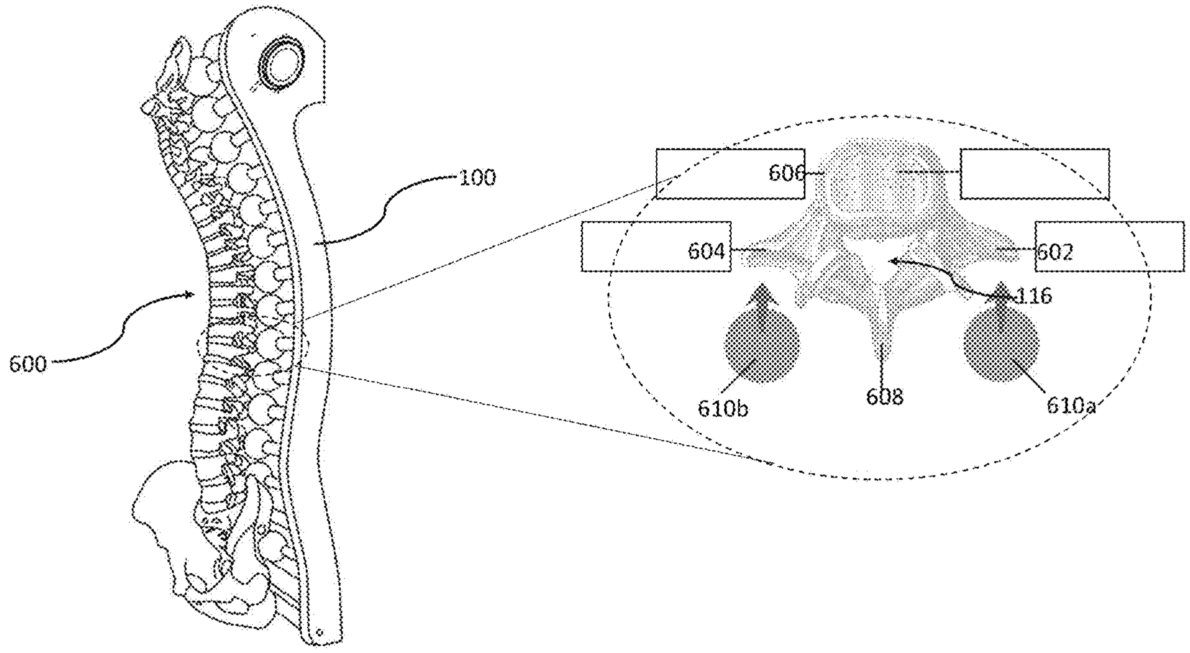
FIG. 6 illustrates a close view of position of spindle nodules positioned and abutting the facet joints of spine in accordance with the disclosed architecture.

FIG. 6 illustrates a close view of the nodules positioned and abutting the facet joints of a spine 602, 604 in accordance with the disclosed architecture. The exemplary nodules 610*a*, 610*b* of a spindle are configured to push up both sides of the spine 600. The nodules 610*a*, 610*b* push up under the transverse processes 602, 604. In turn, this lifts the individual vertebrae 606, causing the vertebra 606 to pivot. As a result of this, decompression occurs, and the spine lengthens. Accordingly, the joint mobility and soft-tissue elasticity increases and stiffness is reduced.

Figure 7:
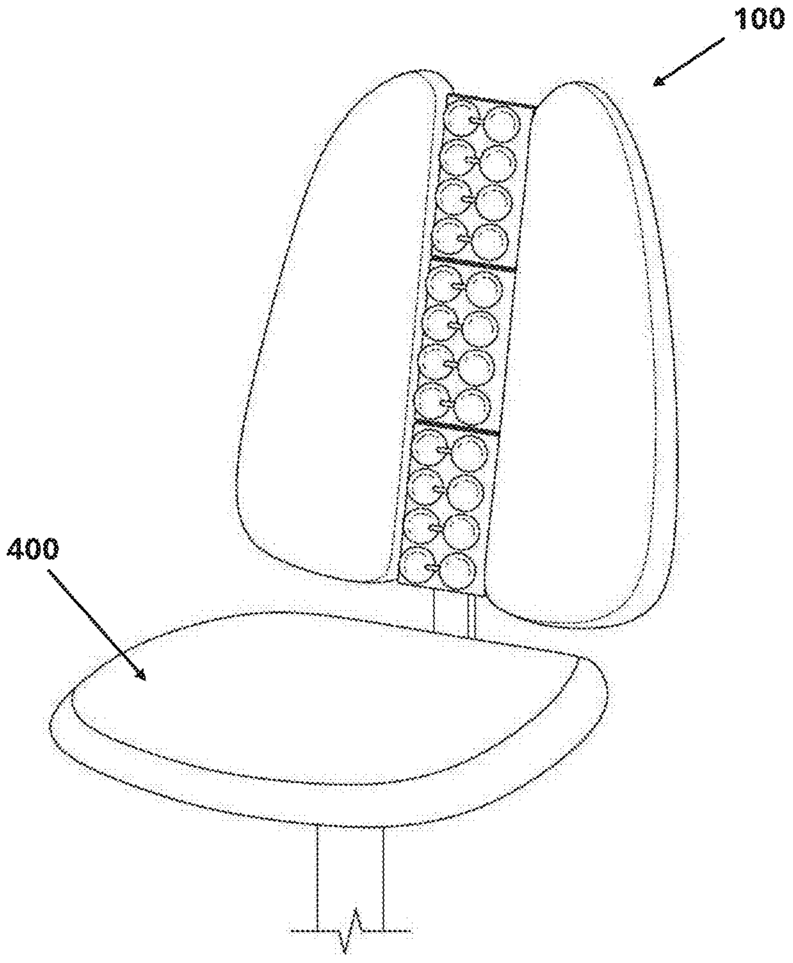
FIG. 7 illustrates an environmental view of one potential embodiment of the electric spine back rack device of the present invention in accordance with the disclosed architecture.

FIG. 7 illustrates an environmental view of one potential embodiment of the electric spine back rack device 100 of the present invention installed in a chair in accordance with the disclosed architecture. The electric spine back rack device 100 of the present invention is an orthopedic spine back rack device for preferably decompressing facet joints and assisting in alleviating back pain. The electric spine back rack device 100 is configured to support the spine of an individual. More specifically, the electric spine back rack device 100 provides decompression of the facet joints on the cervical, thoracic and lumbar regions of the spine without causing any side effects. The electric spine back rack device 100 provides complete relief from skeletal pain and tension and helps in increasing flexibility, mobility, and range of motion.

The electric spine back rack device 100 is also configured to be installed in automobiles, airplanes, office seats and other similar setups, thereby allowing for decompression of the facet joints/vertebras of the spine of a user sitting on a seat with the electric spine back rack device 100 installed.

As illustrated in this embodiment, the electric spine back rack device 100 is positioned in the backrest 402 such that the nodules abut against the facet joints of a user sitting on the chair 400. In one embodiment, the electric spine back rack device 100 is integrated into a chair 400 and alternatively, the electric spine back rack device 100 may be retrofitted to the chair 400.

It should be appreciated that based on the design of the chair 400 and requirements of a user 500, the dimensions of the electric spine back rack device 100 may vary and even the mechanical pressure applied by the electric spine back rack device 100 may vary.

Other shapes, designs and configurations of the electric spine back rack device 100 may be contemplated and fall within the scope of the disclosure without affecting the utility of the device. Since the device may be installed on any type of seat, the device may come in different sizes, shapes, materials and more. In some embodiments, the spine back rack device 100 may be detachably attached and may be used for all forms of transport, from cars and trucks to trains and airplanes.

Figure 8:
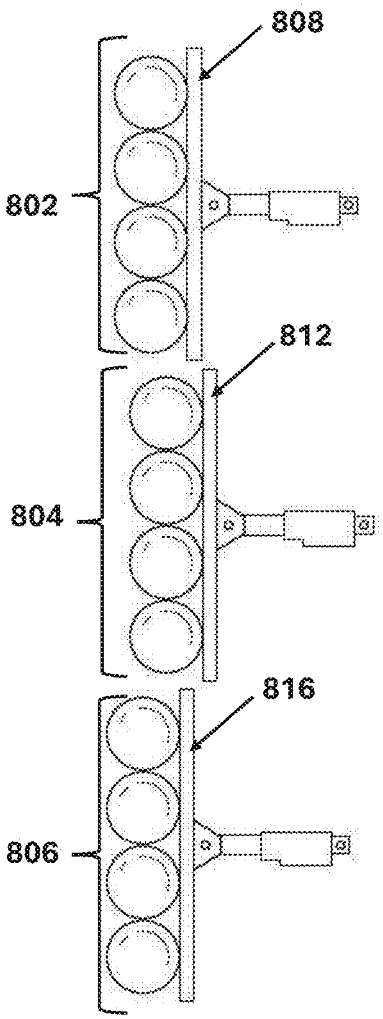
FIG. 8 illustrates a left side view of one potential embodiment of the modules of the electric spine back rack device of the present invention in accordance with the disclosed architecture.
Figure 9:
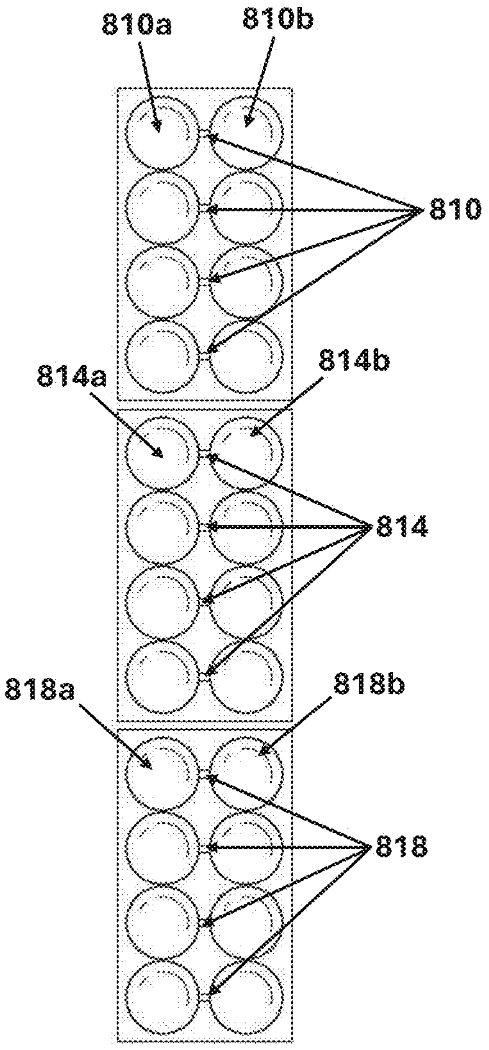
FIG. 9 illustrates a front view of one potential embodiment of the modules of the electric spine back rack device of the present invention in accordance with the disclosed architecture.

As shown in FIG. 8, the electric spine back rack device 100 is comprised of a set of three modules 802, 804, 806. A first module 802 is comprised of a plate 808 preferably made of a durable and hard material, including, but not limited to a heavy-duty plastic. A set of spindles 810 is secured to a front 808*a* of the plate 808, and wherein each set of spindles 810 comprises a pair of barrel shaped nodules 810*a*, 810*b* for applying pressure on the facet joints (as seen in FIG. 9). More specifically, the pair of barrel shaped nodules 810*a*, 810*b* are utilized for decompressing facet joints positioned on the cervical portion of the spinal column.

Similarly, a second module 804 is positioned below the first module 802 and comprises a plate 812 with set of spindles 814 attached to a front 812*a* of the plate, each including a pair of barrel shaped nodules 814*a*, 814*b* for compressing facet joints of thoracic column of the spine (as seen in FIG. 9). The third module 806 comprising a plate 816 with a set of spindles 818 attached to a front of the plate 816*a*, each including a pair of barrel shaped nodules 818*a*, 818*b* is used for decompressing the lumbar column of the spine of a human (as seen in FIG. 9). The pair of spindles in each module are positioned such that the nodules abut the facet joints of the spine.

The nodules of the electric spine back rack device 100 have a diameter of about 48 mm and are round or barrel shaped such that when a user sits against the device 100, the nodules abut against the facet joints or vertebras of the spine. The width of the spindles is about 14 mm and is uniform along the length.

Further, the nodules in each spindle have a transverse distance of 7.5 cm in between and each pair of the nodules has the same distance allowing a symmetric effect on the spine of a user. The electric spine back rack device 100 is configured to put mechanical pressure for decompressing facet joints along a spine by choosing either module 802, 804, 806, or all the modules. When the spindles penetrate the spine, each vertebra is decompressed individually or several vertebras are decompressed simultaneously.

In one embodiment, the electric spine back rack device 100 is configured to work in two modes: a single action mode 202 and a block action mode 204. The push button 120 may be used for selecting one of the two modes for decompressing facet joints of the spine. In single action mode 202, a pressure is applied to any section of the spine i.e., one of cervical (via the first module 802), thoracic (via the second module 804) or lumbar section (via the third module 806) of the spine at one time. As an example, in single action mode 202, the pressure is applied to facet joints of L1 to L5 vertebras of lumbar column of the spine. The pressure is configured to be applied for up to six seconds and may be applied in a constant or intermittent manner.

In block action mode 204, each module 802, 804, 806 is activated simultaneously allowing a plurality of vertebras being pressurized allowing decompressing of different facet joint positioned in different sections of the spine.

The distance between the centers of the corresponding nodules 810*a*, 810*b*; 814*a*, 814*b*; 818*a*, 818*b* is about 75 mm which is designed specifically to match the gap/distance between the human spine facet joints that run through the spine. It should be noted that in the exemplary embodiment the nodules have the same shape and sizes allowing a uniform mechanical pressure to be applied to the facet joints/vertebras of the spine of a user.

The nodules are configured to push up both sides of the spine. The nodules push up under the transverse processes. In turn, this lifts the individual vertebrae, causing the vertebra to pivot. As a result of this, the joints are decompressed, and the spine lengthens. Accordingly, the joint mobility and soft-tissue elasticity increases and stiffness is reduced. In the preferred embodiment, the nodules are wooden. In other embodiments, the nodules may be made of other materials.

Figure 10:
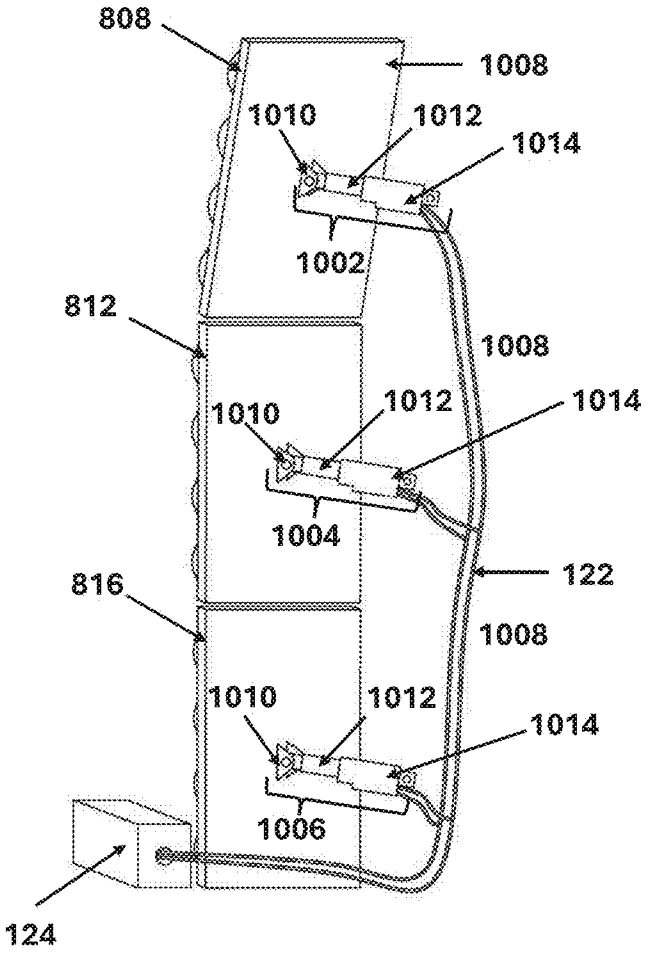
FIG. 10 illustrates a perspective back view of one potential embodiment of the electric spine back rack device of the present invention in accordance with the disclosed architecture.
Figures 11, 12:
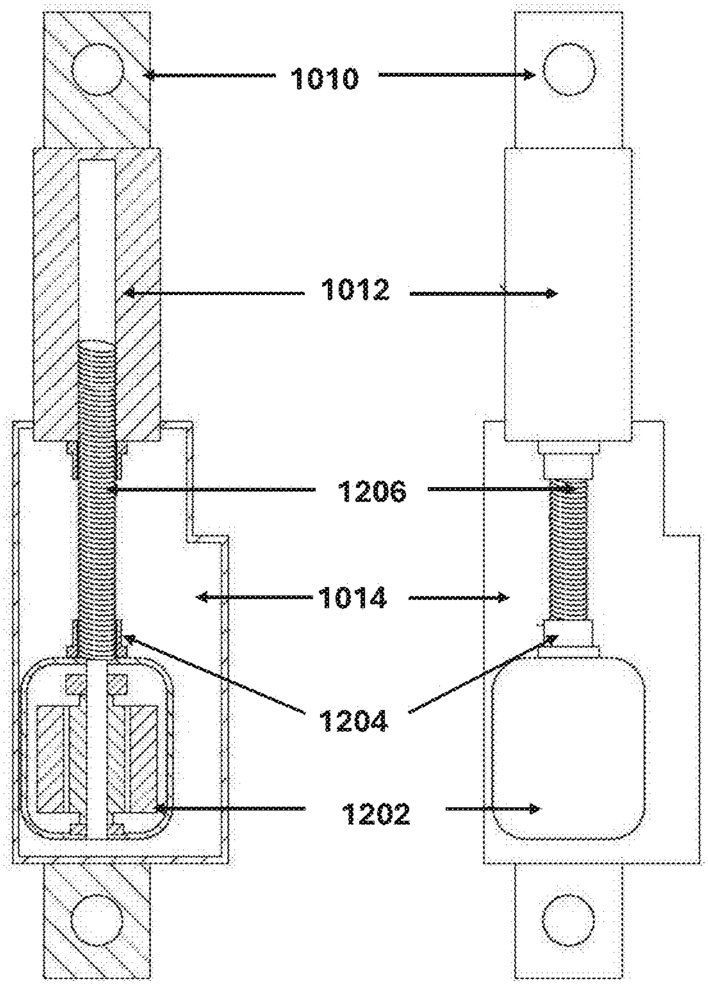
FIG. 11 illustrates an internal side view of one potential embodiment of the actuator module of the electric spine back rack device of the present invention in accordance with the disclosed architecture.
FIG. 12 illustrates a side view of one potential embodiment of the actuator module of the electric spine back rack device of the present invention in accordance with the disclosed architecture.

As seen in FIG. 10, each module 802, 804, 806 has a corresponding actuation module 1002, 1004, 1006. The actuation modules 1002, 1004, 1006 attach to a back 1008 of their corresponding plates 808, 812, 816 via a bracket 1010. In other embodiments, the actuation modules 1002, 1004, 1008 may attach to the back 1008 via other means. From the bracket 1010 extends to an arm 1012 that attaches the bracket 1010 to a main housing 1014. The main housing 1014 further comprises a compact gearmotor 1202, an actuator 1204, and a shaft 1206 (as can be seen in FIG. 12).

The actuation modules 1002, 1004, 1006 are responsible for moving their corresponding modules 802, 804, 806 in order to apply mechanical pressure to a user's spine, decompressing the associated facet joints. For instance, when powered, the actuation module 1002 of the first module 802 applies pressure to the plate 808 of the first module 802 by extension of the arm 1012 thereby pushing the plate 808 forward into the back of a user and by extension, all the barrel shaped nodules in this module 802, thereby decompressing the facet joints of the cervical part of the spine. Similarly, when powered, the actuation module 1004 of the second module 804 applies pressure to the plate 812 of the second module 804, and subsequently, all the barrel shaped nodules in this module 804, decompressing the facet joints of the thoracic part of the spine. Moreover, when powered, the actuation module 1006 of the third module 806 applies pressure to the plate 816 of the third module 806, and subsequently, all the barrel shaped nodules in this module 806, decompressing the facet joints of the lumbar part of the spine. Each actuation module 1002, 1004, 1006 may be activated alone or in combination with the other actuation modules. This allows the user to target either an individual portion of their spine or their entire spine depending on their needs.

Further, the electric spine back rack device 100 is coupled to a circuit 122 running behind the plates 808, 812, 816 wherein electric current is passed from a power source 124 to one or more modules 802, 804, 806 for applying nodule penetration.

In a preferred embodiment, the current is fed to the gearmotor 1202 which converts the electrical energy into mechanical energy, which is then fed to the actuator 1204. The actuator then turns this mechanical energy into mechanical motion, creating the mechanical pressure needed to decompress the user's vertebra. The inner workings of the actuation modules can be seen in FIGS. 11-12.

In the preferred embodiment, the depth of the spindle penetration applied by the mechanical pressure may be up to 10 mm transversely depending on an individual person's tissue thickness/mass layers tissues and muscles. Moreover, in the preferred embodiment, the power source 124 may be a rechargeable battery. In other embodiments, the power source 124 may be a mains power source. In embodiments using the mains power source, a transformer is needed.

When a person is in contact with the device 100, the actuator 1204 must overcome lateral resistance from body weight. A conservative estimate is that this resistance could range from 50 N to 200 N per module depending on load distribution and materials. Adding a safety factor and allowing for friction in the guides, a more appropriate design force is in the region of 250-400 N per module (around 300 N nominal). If all three modules 802, 804, 806 are to move simultaneously, this equates to approximately 900 N total. It is possible to achieve this with a rotary drive and a 5 mm effective radius which would require around 1.5 N·m torque per module (4.5 N·m total).

Considering the force requirements, in one embodiment, the actuation modules 1002, 1004, 1006 may employ a cam-and-follower system. In another embodiment, the actuation modules 1002, 1004, 1006 may use crank-slider linkages. Both embodiments may translate rotary motion from the compact gearmotor 1202 into precise short-stroke linear travel and are well-suited to handling necessary loads with minimal complexity. Wedge or ramp drives can achieve large mechanical advantage, allowing a smaller motor to move a loaded module (module with a person in contact). Further, both mechanisms can be engineered to match the required timing, stroke, and control interface, while offering improved robustness, reduced cost per module, and easier scalability for scenarios where multiple modules operate simultaneously under load.

Based on the required 10 mm movement over about 10 seconds, the energy needed to move each unloaded module (about 400 g) is very small, only a few hundredths of a watt, because the travel is short and slow. However, when a person is in contact with the system, the actuators must work against extra sideways resistance from body weight and bedding. In this case, each actuation module 1002, 1004, 1006 may need to provide 250-400 N of force, which is about 1 watt of average electrical power during movement, but the drive system must be capable of delivering much higher peak force at low speed. In practice, this means the gearmotor 1202 and gearing should be chosen for their torque capacity rather than their continuous power rating. At 24 volts, a loaded module would typically draw around 40-50 mA while moving (80-100 mA at 12 volts), with higher currents briefly at startup. The key point is that although the movement consumes little energy overall, the actuator 1204 must be strong enough to handle short bursts of high load when someone is on the system.

Where all three modules 802, 804, 806 (twelve spindles), each with their own actuator 1204 running continuously under full load, each spindle would draw approximately 1 W, giving a total of around 12 W. Adding roughly 0.4 W for control electronics, the combined continuous power draw would be about 12.4 W. On a 90 Wh flight-safe battery, this would provide in the region of 7 hours of nonstop operation before recharge. In reality, the system will operate intermittently, so actual battery life is expected to be significantly longer, but this figure offers a conservative upper limit for power system sizing.

Figure 13:
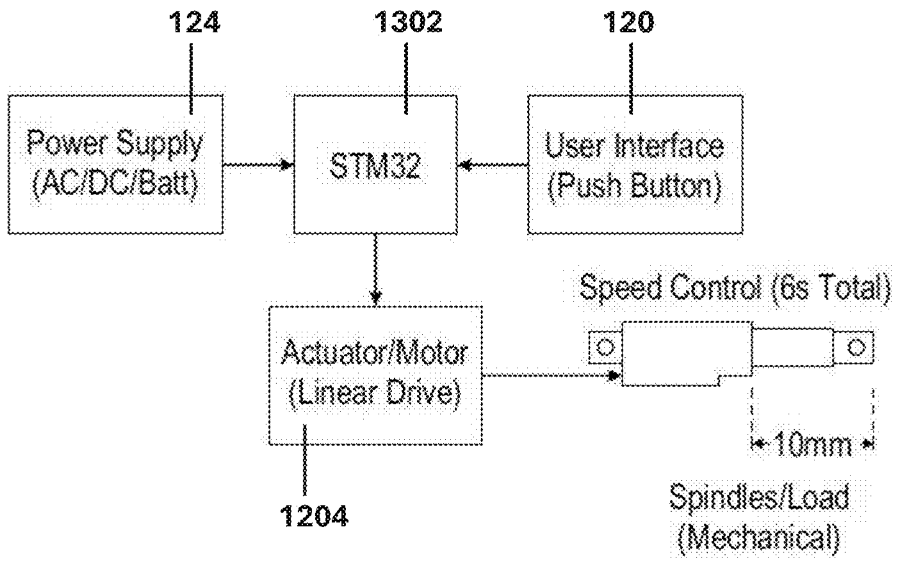
FIG. 13 illustrates an electrical control box diagram of one potential embodiment of the electric spine back rack device of the present invention in accordance with the disclosed architecture.

FIG. 13 shows an electrical control box diagram of one potential embodiment of the electric spine back rack device. In a preferred embodiment, the device 100 will be controlled via a straight-forward, user-operated interface with movement initiated by the push button 120 that triggers the actuator 1204 for the selected module 802, 804, 806. An onboard control unit 1302 (provided by a microcontroller like a STM32) manages the timing, ensuring a smooth 10 mm travel over approximately 10 seconds, followed by a hold period of at least 6 seconds before retraction or repetition. Power to the actuator 1204 is delivered either from a mains supply via a Switch Mode Power Supply (SMPS) or from a rechargeable battery. The design may allow for independent or simultaneous operation of the three modules 802, 804, 806, with the control logic determining which actuators are engaged based on the selected mode. Optional safety features, such as limit switches or current sensing, can be integrated to protect the mechanism and ensure reliable operation under varying loads.

In another embodiment, an advanced version of the system could replace the basic control unit 1302 with an ESP32 microcontroller, enabling wireless configuration and control via Bluetooth of Wi-Fi. This would allow a user to adjust movement settings such as stroke timing, hold duration, and module selection directly from a smartphone or tablet, using a simple app or web-based interface. The ESP32's built-in connectivity would also make it possible to store multiple user profiles, run preset motion sequences, or update firmware remotely for future feature improvements. This approach would not only increase convenience and customization but also remove the need for additional physical controls, keeping the hardware layout simple while expanding functionality.

Notwithstanding the foregoing, the electric spine back rack device 100 of the present invention may be of any suitable size and configuration without affecting the overall concept of the invention, provided that it accomplishes the above stated objectives. Other shapes, designs and configurations of the electric orthopedic spine back rack 100 are contemplated and fall within the scope of the invention without affecting the utility of the device. The spine back rack car seat support works for travelling or resting. The device may be detachably attached and may be used for all forms of transport, from cars and trucks to trains and airplanes.

One of ordinary skill in the art will appreciate the electric spine back rack device 100 as shown in the Figures are for illustrative purposes only, within the scope of the present disclosure. Although the dimensions of the electric back rack device 100 are important design parameters for user convenience, the electric spine back rack device 100 may be of any size that ensures optimal performance during use and/or that suits the user's needs and/or preferences.

Various modifications and additions may be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An electric spine back rack orthopedic device comprising:

a set of modules, wherein each module comprises:

a plate;

a set of spindles; and a plurality of pairs of nodules;

wherein the set of spindles are secured to a front of the plate, and each of the set of spindles comprises one of the plurality of pairs of nodules for applying pressure;

a set of actuation modules located on a back of the plate of each module of the set of modules, wherein each actuation module comprises:

a bracket;

an arm; and a housing;

wherein the bracket is secured to the back of the plate and is connected to the housing by the arm;

wherein the housing comprises:

a gearmotor;

an actuator; and a shaft;

a power source;

a push button; and an onboard control unit.

2. The electric spine back rack orthopedic device of claim 1, wherein the set of modules are configured to be located in a position of cervical, thoracic, and lumbar regions of a human spine.

3. The electric spine back rack orthopedic device of claim 1, wherein each spindle of the set of spindles is 14 mm.

4. The electric spine back rack orthopedic device of claim 1, wherein the nodules of each pair are positioned 7.5 cm apart.

5. The electric spine back rack orthopedic device of claim 1, wherein the pressure applied by the plurality of pairs of nodules is configured to be up to 10 mm transversely.

6. The electric spine back rack orthopedic device of claim 1, wherein the push button is configured to be switched between a single action mode and a block action mode.

7. The electric spine back rack orthopedic device of claim 1, wherein electric power is configured to be transferred from the power source through a wired circuit.

8. The electric spine back rack orthopedic device of claim 1, wherein the electric spine back rack orthopedic device is configured to be integrated in a chair at a time of manufacturing of the chair.

9. The electric spine back rack orthopedic device of claim 1, wherein the electric spine back rack orthopedic device is configured to be retrofitted to a backrest of a chair.

* * * * *